(12) United States Patent
Richard et al.

(10) Patent No.: US 7,942,455 B2
(45) Date of Patent: May 17, 2011

(54) DEVICE FOR CONNECTING A FLUID CIRCULATING LINE TO A REFRACTORY ELEMENT AND REFRACTORY ELEMENT

(75) Inventors: François-Noël Richard, Chatenois (FR); Aldo Ruffaldi, Kraainem (BE)

(73) Assignee: Vesuvius Crucible Company, Wilmington, DE (US)

( * ) Notice: Subject to any disclaimer, the term of this patent is extended or adjusted under 35 U.S.C. 154(b) by 850 days.

(21) Appl. No.: 10/544,756

(22) PCT Filed: Feb. 3, 2004

(86) PCT No.: PCT/BE2004/000018
§ 371 (c)(1),
(2), (4) Date: May 2, 2006

(87) PCT Pub. No.: WO2004/069451
PCT Pub. Date: Aug. 19, 2004

(65) Prior Publication Data
US 2006/0232062 A1 Oct. 19, 2006

(30) Foreign Application Priority Data
Feb. 7, 2003 (EP) .................................. 03447021

(51) Int. Cl.
*F16L 17/00* (2006.01)
(52) U.S. Cl. ........................................ 285/338; 285/346
(58) Field of Classification Search .................. 285/354, 285/233, 234, 345, 346, 380, 338, 196, 148.5, 285/100
See application file for complete search history.

(56) References Cited

U.S. PATENT DOCUMENTS

| | | | | | |
|---|---|---|---|---|---|
| 723,553 | A | * | 3/1903 | Schoenthaler, Jr. | 137/212 |
| 966,748 | A | * | 8/1910 | Honecker | 285/338 |
| 1,602,248 | A | * | 10/1926 | Page | 285/137.11 |
| 1,993,307 | A | * | 3/1935 | Nicholson | 138/89 |
| 2,343,774 | A | * | 3/1944 | Klein | 285/8 |
| 2,683,499 | A | * | 7/1954 | De Croes | 137/593 |
| 2,979,132 | A | * | 4/1961 | Taylor et al. | 166/138 |
| 3,093,156 | A | * | 6/1963 | Nielsen | 137/328 |
| 3,421,782 | A | * | 1/1969 | Hulick et al. | 285/248 |
| 3,768,839 | A | * | 10/1973 | Thompson | 285/15 |
| 3,847,392 | A | * | 11/1974 | Horwinski | 285/302 |
| 4,154,465 | A | * | 5/1979 | Van Meter | 285/312 |
| 4,165,893 | A | * | 8/1979 | Fields | 285/148.23 |
| 4,225,159 | A | * | 9/1980 | Van Meter | 285/104 |
| 4,345,783 | A | * | 8/1982 | Bergstrand | 285/12 |

(Continued)

FOREIGN PATENT DOCUMENTS

DE 394295 4/1924

(Continued)

*Primary Examiner* — Aaron Dunwoody
(74) *Attorney, Agent, or Firm* — Thomas Clinton; Donald M. Satina

(57) ABSTRACT

A device for connecting a fluid circulating line to a refractory element having a wall provided with a cylindrical bore comprises a gasket intended to be located into the bore and a first supporting element compressing the gasket from the outside of the bore. A second supporting element which can be introduced into the bore sandwiches the gasket together with the first Supporting element and a rod brings the two supporting elements closer so as to compress the gasket. Also, a refractory element, notably a nozzle or pouring shroud, is provided with a cylindrical bore size to receive two supporting elements and a tightening gasket sandwiched by these supporting elements.

13 Claims, 2 Drawing Sheets

U.S. PATENT DOCUMENTS

| | | | | |
|---|---|---|---|---|
| 4,407,531 A | * | 10/1983 | Raush et al. | 285/142.1 |
| 4,529,007 A | * | 7/1985 | Goforth | 138/89 |
| 4,541,537 A | * | 9/1985 | Sailor | 215/274 |
| 4,631,889 A | | 12/1986 | Adam et al. | |
| 4,669,763 A | * | 6/1987 | Phillips | 285/346 |
| 4,776,618 A | * | 10/1988 | Barree | 285/341 |
| 5,104,151 A | * | 4/1992 | Adams | 285/16 |
| 5,310,227 A | * | 5/1994 | Grinsteiner | 285/354 |
| 5,401,061 A | * | 3/1995 | Yamashita | 285/7 |
| 5,697,194 A | * | 12/1997 | Gignac et al. | 52/220.8 |
| 7,478,838 B2 | * | 1/2009 | McBee et al. | 285/101 |

FOREIGN PATENT DOCUMENTS

| | | | |
|---|---|---|---|
| DE | 3306204 A1 | * | 8/1984 |
| DE | 19859422 | | 6/2000 |
| FR | 2763012 A1 | | 11/1998 |
| GB | 774002 | | 5/1957 |
| JP | 57036045 | | 2/1982 |
| JP | 2001087845 | | 4/2001 |
| JP | 2002001498 | | 1/2002 |
| WO | 0183138 A1 | | 11/2001 |

\* cited by examiner

DEVICE FOR CONNECTING A FLUID CIRCULATING LINE TO A REFRACTORY ELEMENT AND REFRACTORY ELEMENT

The invention relates to a device for connecting a fluid circulating line to a refractory element, notably a stopper rod, a nozzle or a pouring shroud, for example to introduce a gas in a pouring channel, to pressurize a chamber, to measure a pressure or to pump a gas. The invention also relates to a refractory element.

A connecting device for a refractory element wherein a seat is provided in the side wall of the element is known from the document FR-A1-2763012, this device comprises a compressible gasket arranged on the seat, a supporting element bearing on the external face of the side wall and elastic means inserted between the supporting element and the gasket which push this last against the seat. The supporting element comprises a band or a hoop which circumscribes the refractory element. In both cases, the region of the refractory element located on the opposite side of the seat supports the reaction force required for the compression of the gasket, which is transmitted thereto through the supporting element.

In such a device, the supporting device has large dimensions so that its thermal expansion causes a substantial increase of the distance left for the gasket between the seat and said supporting element, this imposes to have elastic means relatively voluminous with respect to the size of the gasket to compensate this increase and maintain a sufficient pressure on the gasket.

The document WO-A1-01/83138 proposes to limit this drawback by the insertion of an intermediate metallic element whose expansion can compensate the expansion of the supporting element. Henceforth, the gasket remains permanently in contact with the seat and allows to keep a good tightness despite the temperature changes. The upper end of the metallic element must however also be blocked, for example with a weld making it integral with the band.

The present invention aims at proposing a simpler and more compact solution wherein it is not necessary to have a band for the refractory element.

The present invention relates to a device for connecting a fluid circulating line to a refractory element having a surface provided with a cylindrical bore, comprising a gasket intended to be located into the bore and a first supporting element compressing the gasket from the outside of the bore. This device is characterized in that it comprises a second supporting element which can be introduced in the bore to sandwich the gasket together with the first supporting element and a rod able to bring closer the two supporting elements so as to compress the gasket.

The two supporting elements exert an axial pressure on the gasket, which causes a radial expansion thereof and its application against the wall of the bore where it is located. The originality of the invention rests in the fact that the compression of the gasket does not require any support on the refractory element since both supporting elements are brought closer to one another around the gasket. Thereby, no other effort than the one resulting from the radial expansion of the gasket is applied on the refractory element. By definition, this radial expansion is well distributed around the bore walls and does not generate stresses able to cause a failure of the refractory element. This advantage is even more marked when the bore has a cross section close to a circle. Therefore, according to an advantageous embodiment of the invention, the bore has a substantially circular cross-section. The shape of the gasket is obviously adapted to the shape of the bore. In any case, no axial reaction force from the refractory element (whose resultant is a push of the gasket towards the outside of the bore) is necessary for this compression of the gasket.

Further, according to the invention, it is not necessary to care particularly for the bottom surface of the bore since, contrarily to the solutions of the state of the art, the tightness of the connection is not ensured at the interface of a gasket with this bottom surface. This feature permits, very advantageously, to realize substantial savings in the production costs of the refractory element.

Consequently, the invention is easy to realize provided the different constituents involved are correctly dimensioned. In particular, the gasket and the second supporting element have preferably dimensions allowing their insertion without effort into the bore. The compression of the gasket ensure then not only the tightness of the connection, but also the attachment of the assembly to the refractory element. In the case of a stopper, one can even think about hanging it with the device of the invention.

By providing means to link the line to the rod or to the first supporting element, an autonomous device to connect and bind the fluid line to the refractory element is obtained.

Moreover, the gasket, the two supporting elements and the rod form a relatively compact assembly wherein the thermal expansion is reduced, limiting thereby the risk of lowering the axial pressure of the gasket.

According to a preferred embodiment of the invention, a gasket made from an elastic refractory material, for example graphite, is used.

In the specific case of a graphite gasket, the inventors have observed that in certain circumstances, the connecting device could fail. Without wishing to be linked in any way to this hypothesis, they have considered that a part of the carbon of the graphite gasket could diffuse into the metallic elements in contact with the gasket (for example the supporting elements) by a phenomenon of diffusion/solution in solid phase. The carbon diffusing towards the metallic elements—comprising generally iron—forms with this last pig-iron whose melting point is close to 1150° C. When, in use, the temperature is close to this value, the metallic elements "fuse" and are destroyed. This additional problem has been solved by inserting a barrier between the graphite gasket and the metallic elements. Such a barrier can be physical or chemical. For example, the graphite gasket can be coated with a component resisting the high temperatures and which interacts neither with the carbon nor the iron. In particular, metallic oxides such as aluminum oxide or titanium oxide can be used.

According to another embodiment, an elastic means, for example an elastic washer, is juxtaposed to the gasket to compensate the thermal expansion of the rod and the supporting elements.

According to a particular embodiment of the invention, the rod is a tubular body having a fluid passage canal extending therethrough. This rod can further comprise an outer thread, while at least one of the supporting elements comprises a matching inner thread, the bringing closer of the two supporting elements resulting from a screwing of the supporting element on the rod. In this case, the strength of the compression of the gasket against the bore walls is determined by the tightening couple applied during this screwing.

The rod can be integral with one of the supporting elements, for example the second, which is located into the bore.

In a particular variant of the embodiment, anti-rotating means are provided to block in rotation the rod introduced into the bore. Such anti-rotating means can consist in flat surfaces formed on the sides of the rod, in a portion thereof which can be reached from the outside of the bore or by an anti-rotating-form cooperating with a matching shape of the bore.

A spacing washer, for example made from refractory material or steel, can also be juxtaposed to the gasket on the side of the first supporting element to prevent the gasket extending radially to apply a radial effort too close to the edges of the bore, which are weaker than the rest of the wall.

A flat surface can also be formed in the side wall of the refractory element, around the inlet of the bore, to receive a positioning washer arranged between the first supporting element and the assembly constituted from the gasket and, optionally, the elastic means as well as, optionally, the spacing washer. This positioning washer gives a reference for the introduction of the second supporting element, the gasket and the rod, with respect to the external face of the wall of the refractory element. Further, this positioning washer makes the connection stiffer by resting on the side wall of the refractory element and contributes to bind the fluid line in its most advantageous direction with respect to this wall.

Preferably, the cross-section of the bore is circular.

The invention also relates to a refractory element, notably a nozzle or a pouring shroud, as disclosed hereunder, characterized notably in that it is provided with a cylindrical bore sized to receive two supporting elements and a tightening gasket sandwiched by these supporting elements.

According to particular embodiments:
a flat surface is formed around the inlet of the bore;
the bore is provided with an anti-rotating shape to prevent the rotation of one of the supporting elements.

In order to make easier the understanding of the invention, a particular embodiment, given as a non limiting example, will now be described with reference to the annexed drawings wherein.

Figure 1:
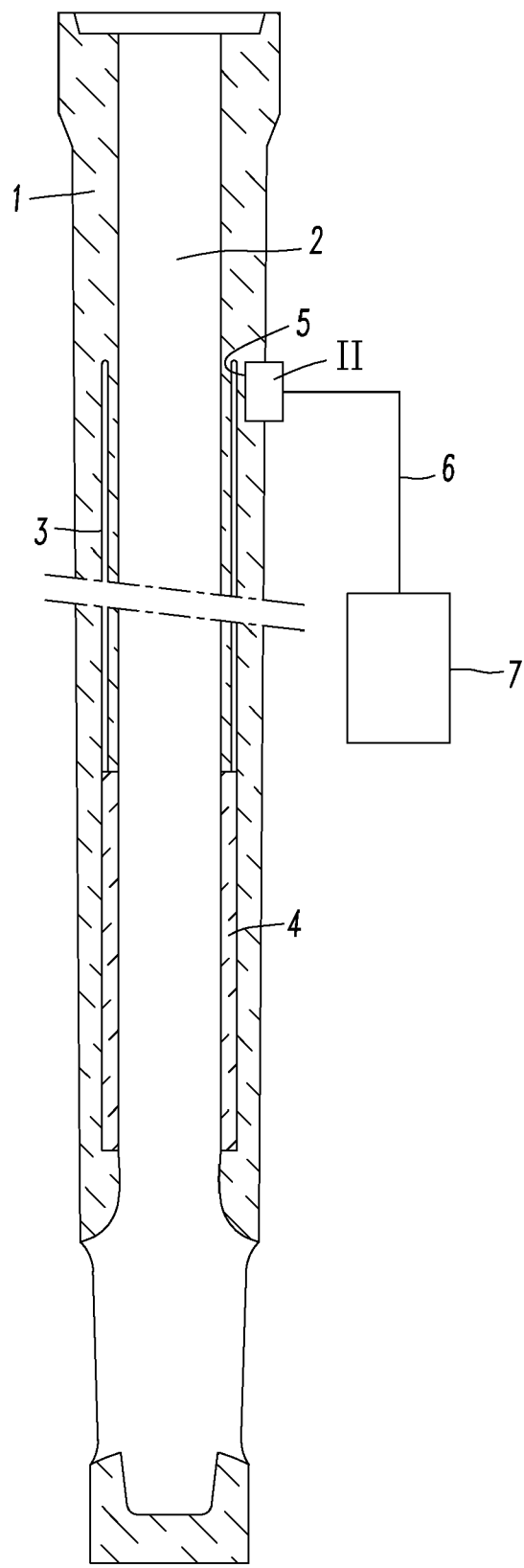
FIG. 1 is a section view of a nozzle (submerged entry nozzle) used in the casting of molten steel.

In the nozzle 1 of FIG. 1, the steel which flows in the channel 2 is protected from the external atmosphere by a supply of gas, so as to avoid notably the formation and build up of alumina on the inner wall of the channel. A gas conventionally used to this end is argon.

To allow its introduction, the nozzle comprises an annular passageway 3 leading to a sleeve 4 made from a porous material which diffuses the argon at the surface of the channel 2 and forms a protective sheath reducing the contact between the steel and the refractory material. The annular passageway 3 is fed through a bore 5 on which a gas feeding line pipe 6 is connected, itself connected to a gas source 7.

Figure 2:
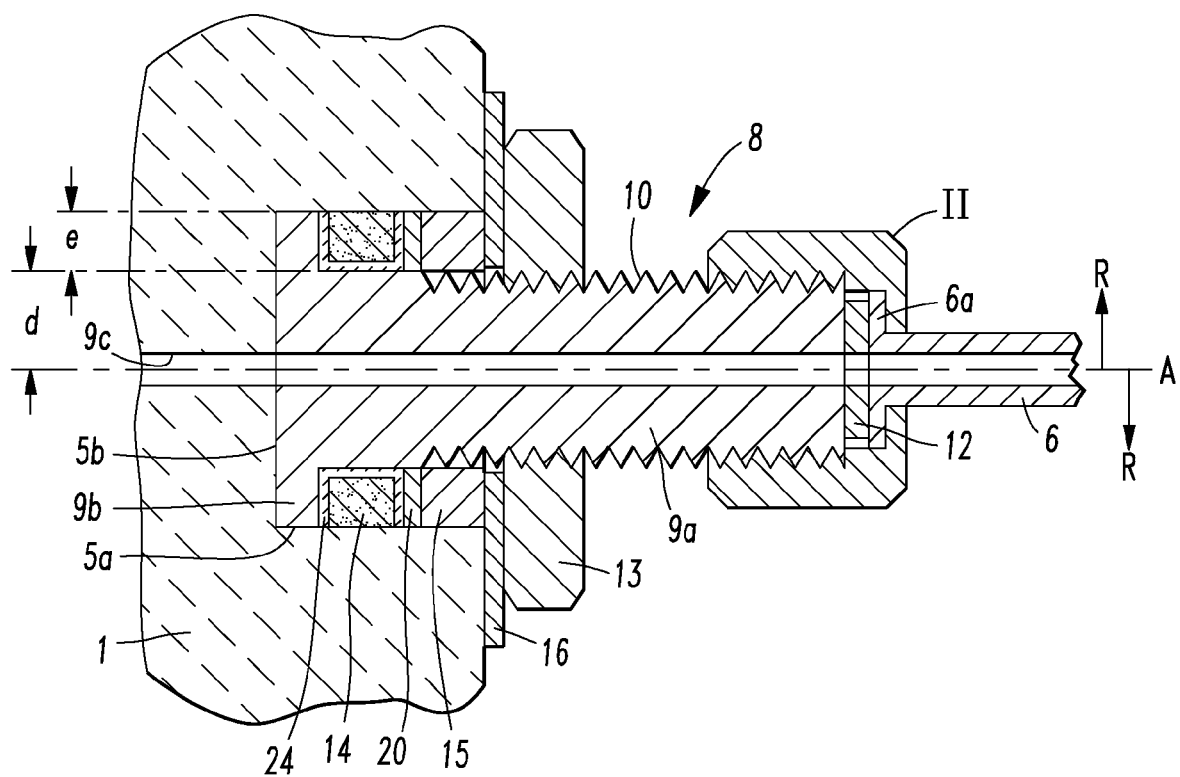
FIG. 2 is a detailed view of the FIG. 1.

The detail of the region II is shown on FIG. 2, wherein the bore 5 is shown with a connecting device 8 arranged at the end of the pipe 6.

This device 8 comprises a body which is constituted of a tubular part 9a and a base 9b, both being traversed by a longitudinal canal 9c disposed about a longitudinal axis of the body A. The body has radial axes R which proceed perpendicularly, in a radial direction, from body longitudinal axis A. The tubular part 9a has a diameter markedly smaller than the bore 5 and leaves around it an annular radial play e, while the base 9e has a diameter which is only slightly smaller than this of the bore 5. Tubular part 9a extends a distance d radially from body longitudinal axis A. Base 9e extends a distance of at most d+e radially from body longitudinal axis A.

The tubular part 9a is threaded and the thread 10 receives an end cap 11 capping the flared end 6a of the pipe 6 and compressing it against a tightening gasket 12 lying on the body end, ensuring thereby a tight connection between the inside of the pipe 6 and the longitudinal canal 9c of the body. The thread also receives a nut 13 which is screwed further near the base 9b.

The base 9b and the nut 13 constitutes two supporting elements which sandwich a tightening gasket 14, a spacing washer 15 and a positioning washer 16 which are engaged in this order around the tubular part of the body before screwing of the nut 13.

The tubular part 9a acts as a puller bringing closer the two supporting elements.

The inner diameters of the tightening gasket 14 and of the two washers 15 and 16 correspond substantially to the external diameters of the tubular part 9a. Washer 16 extends a distance greater than d+e radially from body longitudinal axis A.

The tightening gasket 14 has an external diameter close to this of the bore 5 so that it is forced into this last while the spacing washer 15 has an external diameter close to this of the base 9b and can engage without any friction into the bore 5.

The positioning washer 16 has an external diameter which is markedly larger than the bore 5 so as to bear on the external wall of the nozzle 1 without weakening the edges of the bore 5.

The connecting device 8 can be used in the following manner: after having engaged successively the tightening gasket 14 with a barrier 24 disposed between tightening gasket 14 and base 9b, between tightening gasket 14 and tubular part 9a, and between tightening gasket 14 and nut 13; the elastic means 20, the spacing washer 15, the positioning washer 16 and the nut 13 around the tubular part 9a of the body, the nut is screwed up to a position at a distance of the base such that, when the positioning washer 16 rests against the nozzle 1 during the insertion of the body into the bore 5, the base 9b is close to the bottom end 5b of the bore.

The tightening gasket 14 having been slightly forced into the bore, the connecting device is held in position but can still be extracted if a traction is exerted on the pipe 6.

The screwing of the nut 13 is then continued, which causes the move of the body 9 towards the outside of the bore and, thereby, the bringing closer of the base 9b and the nut 13.

Through the intermediate of the spacing 15 and positioning 16 washers, the gasket 14 is then subjected to an axial pressure which causes its radial expansion.

It is then radially applied against the side wall 5a of the bore around the tubular part 9a carrying thereby, on the one hand, a perfect connection tightness and, on the other hand, the mechanical lock of the device into the bore 5.

It is clear that the above described embodiment has no limiting purpose.

What is claimed is:

1. Device for connecting a fluid circulating line to a refractory element, comprising:
   (a) a body having a longitudinal axis, and having a radial extent from the longitudinal axis, wherein the body comprises a tubular part and a base, wherein the tubular part and the base each have a cylindrical surface, wherein the cylindrical surface of the base is unthreaded, wherein the body is traversed by a longitudinal canal, wherein the cylindrical surface of the tubular part has a threaded portion distal to the base and an unthreaded portion proximal to the base, wherein the cylindrical surface of the tubular part extends a radial distance of d from the longitudinal axis of the body, and wherein the base extends a radial distance of at most the sum of d and a radial distance e from the longitudinal axis of the body;
   (b) a tightening gasket comprising an interior cylindrical surface configured to accommodate the unthreaded portion of the cylindrical surface of the tubular part, and comprising an exterior cylindrical surface extending a radial distance of at most the sum of radial distances d and e from the longitudinal axis of the body, wherein the tightening gasket comprises a refractory material;

(c) a nut comprising an interior threaded surface configured to accommodate the threaded portion of the cylindrical surface of the tubular part;

(d) a barrier disposed between the tightening gasket and the body, and between the tightening gasket and the nut; and (e) a spacing washer comprising an interior cylindrical surface configured to accommodate the threaded portion of the cylindrical surface of the tubular part, and with an exterior cylindrical surface extending a radial distance of at most the sum of radial distances d and e from the longitudinal axis of the body.

2. The device of claim 1, wherein the barrier comprises a coating on the tightening gasket.

3. The device of claim 2, wherein the coating comprises a metallic oxide.

4. The device of claim 3 wherein the metallic oxide is selected from the group consisting of aluminum oxide and titanium oxide.

5. The device of claim 1, further comprising a positioning washer comprising an interior cylindrical surface configured to accommodate the threaded portion of the cylindrical surface of the tubular part, and with an exterior cylindrical surface extending a radial distance of at least the sum of radial distances d and e from the longitudinal axis of the body.

6. The device of claim 5, in which the tightening gasket, spacing washer and positioning washer are engaged successively around the tubular part of the body.

7. The device of claim 6, wherein threadedly engaging the nut onto the threaded surface of the tubular part of the body compresses the tightening gasket in the longitudinal direction and expands the tightening gasket radially to a distance represented by the sum of radial distances d and e from the longitudinal axis of the body.

8. The device of claim 1, further comprising a fluid circulating line, wherein the fluid circulating line is in fluid communication with the longitudinal canal.

9. The device of claim 1, wherein the gasket comprises graphite.

10. The device of claim 1, wherein an elastic washer is juxtaposed to the gasket to compensate for the thermal expansion of the body.

11. The device of claim 1, wherein the interior cylindrical surface of the tightening gasket is unthreaded.

12. Device comprising
(a) a device according to claim 1; and
(b) a refractory element having a bore receiving the device according to claim 1.

13. Device according to claim 12, wherein the bore has an inlet, and wherein a flat surface is formed around the inlet of the bore on the refractory element.

* * * * *